United States Patent [19]
Åhs

[11] Patent Number: 6,095,300
[45] Date of Patent: Aug. 1, 2000

[54] DEVICE FOR THE OPERATION OF AN INSTRUMENT, FOR EXAMPLE AN AXLE

[75] Inventor: Wilgot Åhs, Koppom, Sweden

[73] Assignee: Sem Drive AB, Åmål, Sweden

[21] Appl. No.: 09/171,257

[22] PCT Filed: Apr. 17, 1997

[86] PCT No.: PCT/SE97/00651

§ 371 Date: Oct. 15, 1998

§ 102(e) Date: Oct. 15, 1998

[87] PCT Pub. No.: WO97/40295

PCT Pub. Date: Oct. 30, 1997

[30] Foreign Application Priority Data

Apr. 19, 1996 [SE] Sweden ................................ 9601502

[51] Int. Cl.[7] ........................................................ F16D 3/34
[52] U.S. Cl. ........................... 192/44; 192/84.2; 192/84.3
[58] Field of Search ............................ 192/44, 84.2, 84.3, 192/84.8; 74/142

[56] References Cited

U.S. PATENT DOCUMENTS

| 1,860,492 | 5/1932 | Butler . | |
|---|---|---|---|
| 2,394,085 | 2/1946 | Loughridge . | |
| 2,860,750 | 11/1958 | Avanzati . | |
| 3,586,143 | 6/1971 | Hutchinson . | |
| 4,003,457 | 1/1977 | Dahlstrom | 74/142 X |
| 4,457,416 | 7/1984 | Kutzler . | |
| 4,881,624 | 11/1989 | Ulmann | 192/44 |
| 5,494,232 | 2/1996 | Hirano et al. | 192/44 |
| 5,499,559 | 3/1996 | Lin | 192/44 |

FOREIGN PATENT DOCUMENTS

| 0 544 186 A1 | 6/1993 | European Pat. Off. . |
|---|---|---|
| 349678 | 3/1922 | Germany . |

*Primary Examiner*—Charles A Marmor
*Assistant Examiner*—Saúl Rodriguez
*Attorney, Agent, or Firm*—Ware, Fressola, Van der Sluys & Adolphson LLP

[57] ABSTRACT

In a device for driving an instrument (2), for example an axle, step-by-step, the device includes a driving part (1), a space (3) between the driving part and the instrument (2), and at least one ball/roller (4) which can have different positions (A, B, C) in the space. In the different positions, the ball/roller is clamped between the driving part and the instrument or is not clamped, depending on the design of the space and/or the direction of the driving part. A guiding means can be arranged in order to force the ball/roller to different positions.

11 Claims, 2 Drawing Sheets

DEVICE FOR THE OPERATION OF AN INSTRUMENT, FOR EXAMPLE AN AXLE

BACKGROUND OF THE INVENTION

1. Technical Field

The invention relates to a device for the operation of an instrument, for example an axle.

2. State of Art

Different blocking bearings for the operation of an axle are known. Reversible operation of axle are also known. See for example U.S. Pat. No. 1,860,492 or DE-C-349 678 indicating devices for the operation of a motor axle by means of an electro-magnetically vibrated, oscillating arm which is mounted on bearings on the axle. The axis can be reversibly operated by means of two electro-magnetically vibrating arms, and the devices comprise coupling devices in the form of elastic bands between the axle and the driving device.

SUMMARY OF THE INVENTION

The object of the present invention is to obtain a new and better driving device, which is simple and cheap and which can transmit a forwards and backwards movement of a driving part to a preferably stepwise rotary motion of an instrument using a blocking element which can be controlled to be clamped for clockwise or anti-clockwise rotation or disengagement.

The invention is mainly characterized by the arrangement of a driving part which can be moved in one of two directions within an operation range. The device is such that the driving part can be engaged to or disengaged from the instrument by means of one or more carrier elements, which are situated in one or more specially designed spaces between the driving part and the instrument. The carrier element, which can consist of a ball or a roller, can be guided to take different positions in the space, which is designed in such a way that in the disengagement position the carrier element is not in operation in relation to the driving part and the instrument, and in the engagement position the carrier element is more or less in blocking engagement with the driving part and the instrument when the driving part is moved in one direction but is disengaged when the driving part is moved in the other direction. By these means the mechanical force can be transmitted to the instrument when the driving part is moved in one direction or is disengaged, respectively, when the driving part is moved in said other direction and vice versa. In the last mentioned case, the force transmitted to the instrument decreases or stops.

According to another characteristic of the invention, the carrier element is arranged to co-operate with surfaces in the space of the driving part or the instrument to obtain the blocking engagement between them when the driving part is moved in the direction in question.

Another characteristic of the invention is that the device is designed for a reversible operation. In the space, several engagement positions are arranged which have a friction engagement, between the driving part and the instrument and which are effective in different directions. There are also guiding means to force the carrier element in one of said positions which can be changed externally.

The other characteristics appear from the accompanying claims.

BRIEF DESCRIPTION OF THE DRAWINGS

The invention will now be described in greater detail with reference to examples of embodiments shown in the drawings.

DETAILED DESCRIPTION OF THE INVENTION

Figure 1:
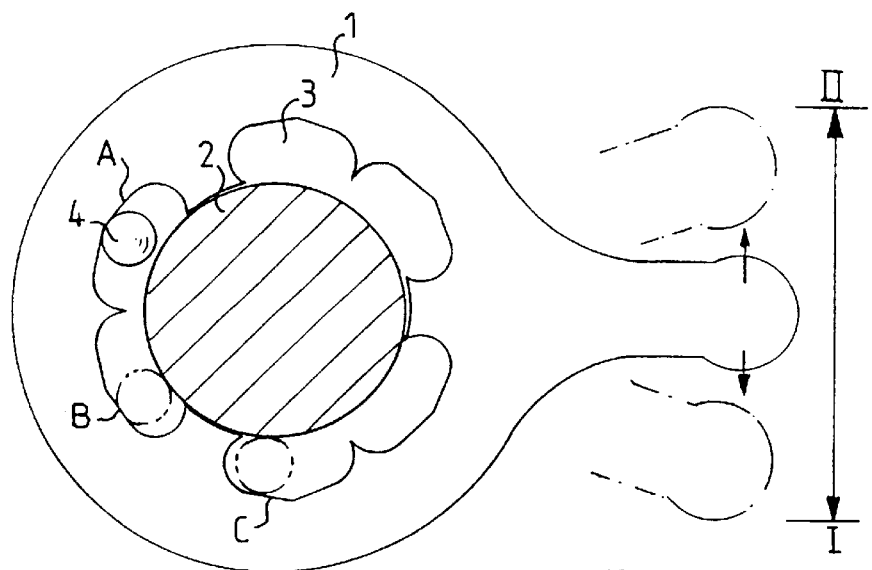
FIG. 1 illustrates how a driving part can be engaged to or disengaged from an instrument to be operated by means of balls/rollers in different positions in a space.

In FIG. 1, a driving part 1 is shown, which is arranged to be able to rotate an instrument 2 step-by-step, for example a threaded axle, or another adjustment device, in one or the other direction or to be disengaged from instrument 2. Thus instrument 2 is arranged to be engaged to driving part 1. This engagement is able to force instrument 2 to a clockwise or an anti-clockwise movement or to be disengaged.

According to the embodiment, driving part 1 is mechanically or electrically arranged to move within the operation range I–II. According to the shown example, the mechanical force from the forwards or backwards movement of driving part 1 is transmitted to instrument 2 via one or more balls or rollers, or similar means, in such a way that the force of the instrument is only transmitted for the rotation in a selected, controlled direction, or that the instrument is disengaged from driving part 1. For the engagement, the balls or rollers 4, or the like are arranged in one or more spaces 3, which are specially designed for each application. In FIG. 1, each space presents a central position in which there is a certain play between driving part 1 and ball/roller 4, and between ball/roller 4 and instrument 2. In the end positions of the space 3 there is no play. When the ball/roller 4 is forced to take these end positions, the ball/roller 4 is clamped between the driving part 1 and the instrument 2 by means of friction between the parts involved, when the driving part 1 is moved in a special direction. The magnitude of the friction and the consequent force with which the instrument 2 is clamped against the driving part 1, is determined by the design of the space and the material of the parts involved.

As examples of embodiment there are arrangements to rotate an axle in one or the other direction by means of a forwards and backwards movement of a driving part 1. However, it is evident to a person skilled in the art that the invention can be used for driving instruments of another type and in another way and with another type of driving movement.

To illustrate the different alternative positions that the balls/rollers 4 can take in the spaces 3, three balls/rollers 4 in different positions A, B or C, respectively, are shown in FIG. 1. It should be noted that all the balls/rollers take the same position in the spaces 3, if the arrangement is used normally.

Accordingly, all the balls/rollers 4 in a device can be forced in one or the other position in the respective space 3 and this position can be changed externally. In position A, ball/roller 4 has such a position in the specially designed space 3 so that no mechanical force can be transmitted from driving part 1 to instrument 2 due to the fact that there is a certain play between driving part 1 and ball/roller 4 and between ball/roller 4 and instrument 2, or due to the fact that the friction between the driving part 1, ball/roller 4 and the instrument 2 is not big enough to drive instrument 2 when driving part 1 is rotated around its axis. When the ball/roller 4 takes position B and driving part 1 rotates clockwise, the ball/roller 4 gets jammed and driving part 1 becomes more or less clamped against instrument 2 which is in such a way forced in the clock-wise direction. When driving part 1 rotates in an anti-clockwise direction, the ball/roller 4 is loosened and can be considered to be disengaged. If the ball/roller 4 is moved in position C the movement corresponds to an anti-clockwise direction. It should be noted that according to the invention there can be other types of positions, for example a position where the ball/roller 'skids', i. e. is not totally clamped between the instrument 2 and the driving part 1.

Figure 2:
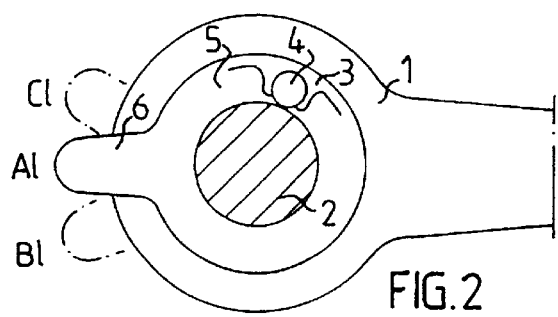
FIG. 2 illustrates the driving part, the instrument and the ball/roller holder with an actuating part.

In order to get the device to operate in the right way, guiding means are required for the positioning of the balls/ rollers 4 in one of said positions. In FIG. 2, the guiding means is a ball/roller holder 5, which is designed to take several angle positions and correspondingly force the balls/ rollers 4 to the desired position in the respective space.

According to the example in FIG. 2, ball/roller holder 5 has three alternative angle positions AI, BI, CI, which correspond to the three positions A, B and C of the ball/roller 4 according to FIG. 1. Ball/ roller holder 5 has an actuating part 6, which can be for example in the form of a projecting part, in order to externally bring about the different alternative angle positions AI, BI and CI.

Figure 3:
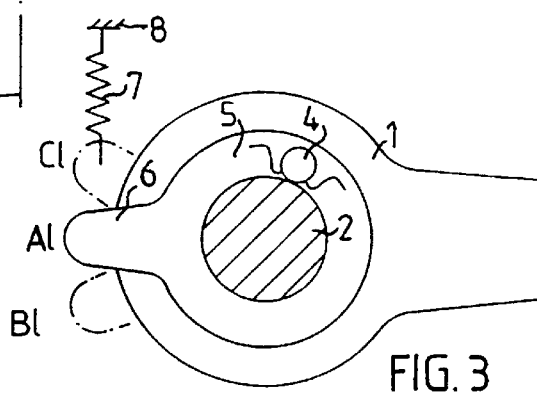
FIG. 3 illustrates a first embodiment showing how the actuating part can be angularly adjusted.

FIG. 3 illustrates a spring combination 7 which can be a draw spring or a shear spring or another spring combination 7. The latter holds ball/roller holder 4 in one of the alternative positions AI, BI or CI. Spring 7 is fastened to a support member 8, i. e. in the frame of the device for the supported mechanical surrounding where instrument (axle) 2 is mounted. Spring 7 is exposed for a changing tension but must obtain a draw or shear effect of ball/roller holder 5 during the whole operation. According to another embodiment, the spring 7 can be anchored in driving part 1.

Figure 4:
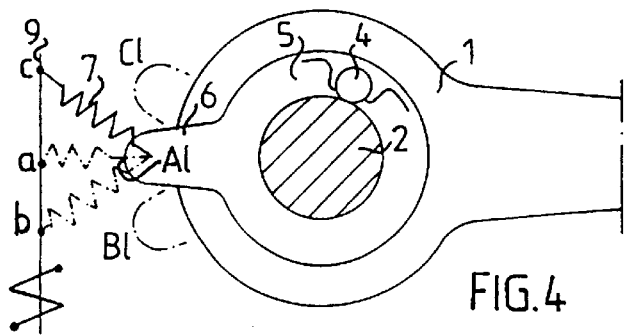
FIG. 4 illustrates a second embodiment showing how the actuating part can be angularly adjusted.

FIG. 4 illustrates an embodiment where spring 7 is fastened to means of attachment 9 via its fastening point. The means of attachment 9 are electrically and mechanically arranged to be moved to suitable alternative positions a, b or c. The actuating part 6 is moved to the corresponding positions AI, BI or CI and the ball/roller 4 to the corresponding positions A, B or C. The device is anchored in the frame, i. e. by support means 8 (not shown).

Figure 5:
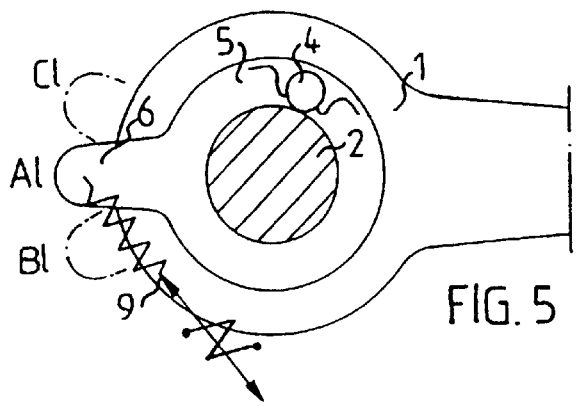
FIG. 5 illustrates a third embodiment showing how the actuating part can be angularly adjusted.

FIG. 5 illustrates another embodiment where the means of attachment 9 to achieve the electrical or mechanical movement of actuating part 6 is arranged on driving part 1.

Figure 6:
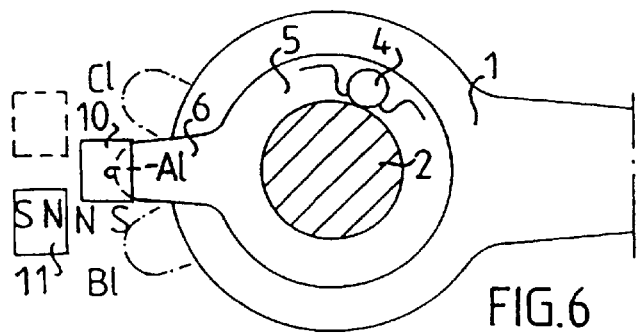
FIG. 6 illustrates a fourth embodiment showing how the actuating part can be angularly adjusted.

FIG. 6 illustrates yet another embodiment in which a permanent magnet 10 or other magnetic material is arranged at actuating part 6. Another magnet device 11 is arranged at frame/support means 8 (not shown). If magnet 10 at actuating part 6 is a permanent magnet and the other magnet, magnet 11, is another permanent magnet, the desired angle positions AI, BI and CI of the actuating part 6 can be attained by suitable polarization of the magnets and therewith a desired direction and operation of the movement of the axle.

Figure 7:
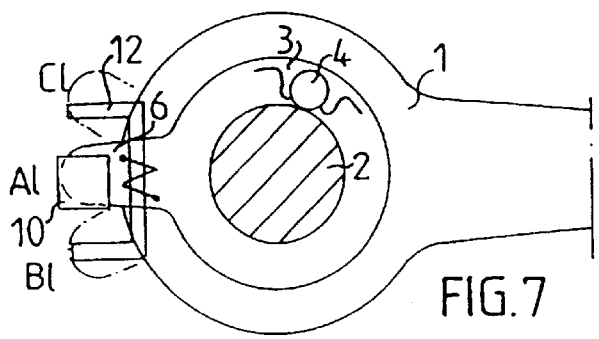
FIG. 7 illustrates a fifth embodiment showing how the actuating part can be angularly adjusted.

FIG. 7 shows another embodiment of the invention, where a U-formed electromagnet 12 is arranged on driving part 1 with its legs corresponding to the angle positions BI and CI.

By applying a current in one or the other direction through a winding on U-magnet 12, a magnet 10 attached to actuating part 6, can move between the different angle positions AI, BI or CI, and by these means force ball/roller 4 to the different corresponding positions A, B or C in the space, whereby instrument 2 is engaged to/disengaged from driving part 1. When the driving part is forced to a movement within the operating range I–II, this movement is transmitted to a rotating step-by-step movement of instrument 2 in one or the other direction depending on the angle position of the actuating part 6, which in turn depends on the magnetization of electromagnet 12. (FIG. 7). The current pulses for the magnetization can be arranged to be computer controlled.

This device has many degrees of freedom of the design as the selected permanent magnets can have different polarization, remagnetization of direction or different electromagnets and different current pulses and combinations for obtaining the desired function.

The forwards and backwards movements of driving part 1 can be arranged to be controlled by means of electromagnets with computer controlled current pulses.

Figure 8:
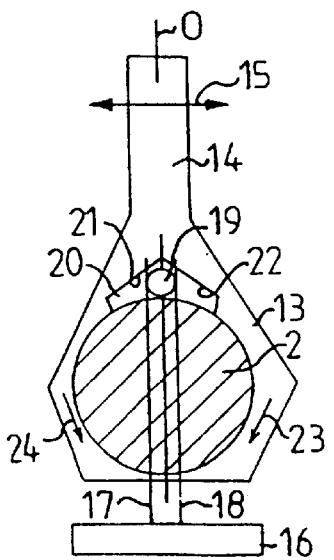
FIG. 8 illustrates an additional embodiment of the invention.

FIG. 8 shows yet another embodiment of the invention. A driving part 13 is mounted, as above, around an axle 2, the driving part 13 being equipped with a driving arm 14 which is intended to be actuated for rotation in the directions of the two-way arrows 15. Driving part 13 and driving arm 14 are schematically illustrated in this case. It is supposed that the whole device is built up on a support 16 in which axle 2 is mounted. The support holds two plate springs 17 and 18 which are arranged to hold in position a carrier means in the form of a roller 19.

As in the other embodiments there is a space 20 in driving part 13 which is so designed that the inner surfaces 21 and 22 together with the other surfaces of the axle 2 form tapered spaces on both sides of roller 19. The shown device is supposed to have a neutral position for driving part 13 and 14 denoted by O. This implies that the device is designed to operate in an operating range from said neutral position O to an end position to the right or to left of driving arm 14, which is not shown, as indicated by the two-way arrow 15.

It is supposed that arm 14 is moved to the right in the drawing by means of a driving mechanism, not shown, i. e. in a direction of movement represented by arrow 23. Therefore space 20 will be displaced relatively to the axle which means that surface 21 will co-operate with roller 19, which in turn is clamped between surface 21 and the outer surface of axle 2. The axles will rotate together with driving part 13 in the direction of arrow 23. Supposing also that the arm 14 is moved forwards and backwards between the neutral position and an end position, to the right in the figure, the axis 2 step-by-step will be forced in the direction of arrow 23. Returning to neutral position O, as illustrated in the drawing, roller 19 is disengaged from surfaces 21 and 22. If arm 14 is moved to the left on the drawing, an analogous movement will happen, i. e. the roller 4 will co-operate with surface 22 and bring the axle in rotation in the direction of the arrow 24.

The described embodiment is a variant of the above described embodiments as it operates from a neutral position with two operating ranges on both sides of the neutral position, which can be advantageous in some applications. It should be noted that the roller 4 can be held in said position, in the drawing shown in disengagement position, by means of magnetic actuating instead of the guiding between plate springs 17, 18. Other solutions of suspensions can be used.

The described devices can for example be used for operating and adjusting different apparatus in vehicles, for example window regulators, rear view mirrors, seats, luggage boots, doors, (central)locks, sliding roofs, filler caps, air dampers etc. requiring different ways for the command with reference to force, velocity etc. A single computer in the car can be programmed to control the current pulses for different apparatus.

It is evident for the person skilled in the art that the driving part, instruments to be driven, spaces, positions and angle positions, actuating part, springs and magnet devices can be designed in another way than is shown. The scope of the invention is only restricted by the characteristics of the accompanying claims.

What is claimed is:

1. A device for the reversible operation of an instrument, comprising:

(a) a driving part which can be moved in a first direction and a second direction within an operating range, the driving part defining at least one space in which at least one carrier device can be arranged between the driving part and the instrument;

(b) at least one carrier device arranged to take selected positions in the at least one space, the at least one carrier device is adapted to be inactive in relation to both the driving part and the instrument in at least one of the selected positions, and the at least one carrier device in at least one of the selected positions is adapted to be in a substantially clamped engagement to the driving part and the instrument so that when the driving part is moved in the first direction, but is not engaged when the driving part is moved in the second direction;

(c) guiding means including an actuating part for forcing the at least one carrier device into one of the selected positions; and (d) means for positioning the actuating part by power of attraction to thereby force the at least one carrier device into one of the selected positions.

2. A device according to claim 1, wherein said means for positioning the actuating part is a magnet, which is arranged on the actuating part for cooperation with a magnet device arranged on a support.

3. A device according to claim 1, wherein said means for positioning the actuating part is an electromagnet arranged on the driving part and a permanent magnet arranged on the actuating part so that the actuating part moves between different angle positions depending on current pulses applied to the electromagnet, the at least one carrier device being arranged to take the selected positions in the at least one space which correspond to the different angle positions of the actuating part and thereby being adapted to engage and disengage the instrument to the driving part when the driving part is moved in the first and second directions, respectively.

4. A device according to claim 1, wherein the driving part is adapted to operate in relation to the instrument from a neutral position and having the operating range extending on both sides of the neutral position, the at least one space being designed symmetrically with surfaces of the driving part, which surfaces are arranged to make an angle with each other, the at least one carrier device being arranged to be moved to one of the selected positions in the at least one space which is a disengagement position corresponding to the driving part being in the neutral position, the at least one carrier device arranged to be held towards the disengagement position by means of spring blades arranged in a support, the spring blades being adapted to be carried in the first and second directions of the driving part during movement of the at least one carrier device.

5. A device according to claim 4, wherein the carrier device is arranged to be held towards the disengagement position by magnetic means.

6. In combination, the device according to claim 4, and an instrument, the instrument being part of an adjustable apparatus of a vehicle.

7. In combination, the device according to claim 1, and an instrument, the instrument being part of an adjustable apparatus of a vehicle.

8. A device for the reversible operation of an instrument, comprising:

(a) a driving part which can be moved in a first direction and a second direction within an operating range, the driving part defining at least one space in which at least one carrier device can be arranged between the driving part and the instrument;

(b) at least one carrier device arranged to take selected positions in the at least one space, the at least one carrier device is adapted to be inactive in relation to both the driving part and the instrument in at least one of the selected positions, and the at least one carrier device in at least one of the selected positions is adapted to be in a substantially clamped engagement to the driving part and the instrument so that when the driving part is moved in the first direction, but is not engaged when the driving part is moved in the second direction;

(c) guiding means including an actuating part for forcing the at least one carrier device into one of the selected positions; and (d) means for positioning the actuating part by power of attraction to thereby force the at least one carrier device into one of the selected positions, said means for positioning the actuating part is spring means which is adapted to be fastened to a support for the instrument.

9. A device according to claim 8, wherein said spring means is a draw spring arranged to draw the actuating part towards a constant angle position.

10. A device according to claim 8, wherein said spring means is fastened to a fastening point by means of attachment which is anchored to the support and said means of attachment is electrically or mechanically arranged to be moved to suitable alternative positions, the actuating part being moved to corresponding angle positions.

11. A device according to claim 8, wherein said spring means is fastened to a fastening point by means of attachment which is mounted on the driving means and said means of attachment is electrically or mechanically arranged to be moved to suitable alternative positions, the actuating part being moved to corresponding angle positions.

* * * * *

UNITED STATES PATENT AND TRADEMARK OFFICE
CERTIFICATE OF CORRECTION

PATENT NO.   : 6,095,300
DATED        : August 1, 2000
INVENTOR(S)  : Wilgot Åhs It is certified that error appears in the above-identified patent and that said Letters Patent is hereby corrected as shown below:

Column 1,
Line 8, "State of Art" should be -- State of the Art --.
Line 14, "axis" should be -- axle --.

Column 3,
Line 15, after "C", -- , -- should be inserted.

Column 4,
Line 47, "axles" should be -- axle 2 --.

Signed and Sealed this

Twenty-ninth Day of October, 2002

Attest:

JAMES E. ROGAN
Attesting Officer      Director of the United States Patent and Trademark Office